United States Patent
Crainic et al.

(10) Patent No.: US 7,841,651 B2
(45) Date of Patent: Nov. 30, 2010

(54) VEHICLE FRONT END ASSEMBLY

(75) Inventors: Kristin Suokas Crainic, Canton Township, MI (US); Mauro Pelini, Shelby Township, MI (US)

(73) Assignee: Nissan North America, Inc., Franklin, TN (US)

( * ) Notice: Subject to any disclaimer, the term of this patent is extended or adjusted under 35 U.S.C. 154(b) by 276 days.

(21) Appl. No.: 12/111,557

(22) Filed: Apr. 29, 2008

(65) Prior Publication Data

US 2009/0267364 A1    Oct. 29, 2009

(51) Int. Cl.
*B60R 19/54* (2006.01)
(52) U.S. Cl. .............................. 296/193.09; 296/187.09
(58) Field of Classification Search ............ 296/187.09, 296/193.09, 203.02; 293/102, 155
See application file for complete search history.

(56) References Cited

U.S. PATENT DOCUMENTS

| | | | | |
|---|---|---|---|---|
| 5,066,057 A | * | 11/1991 | Furuta et al. ................. | 293/121 |
| 5,226,695 A | * | 7/1993 | Flint et al. ................... | 296/191 |
| 5,358,304 A | * | 10/1994 | Kanemitsu et al. ...... | 296/193.09 |
| 6,357,821 B1 | * | 3/2002 | Maj et al. .............. | 296/193.09 |
| 6,523,886 B2 | * | 2/2003 | Hoffner et al. ......... | 296/203.02 |
| 6,598,924 B2 | * | 7/2003 | Palmer et al. ................. | 296/29 |
| 7,097,239 B2 | * | 8/2006 | Lazzeroni .............. | 296/203.01 |
| 7,207,617 B2 | * | 4/2007 | Pelini ........................... | 296/29 |
| 7,303,219 B2 | * | 12/2007 | Trabant et al. .............. | 293/155 |
| 7,540,550 B1 | * | 6/2009 | Huber et al. ................... | 296/29 |
| 7,607,723 B2 | * | 10/2009 | Bierjon et al. ......... | 296/203.02 |
| 2002/0117875 A1 | * | 8/2002 | Hoffner et al. .............. | 296/194 |
| 2005/0134068 A1 | * | 6/2005 | Pfister et al. ................... | 296/29 |
| 2006/0202517 A1 | * | 9/2006 | Pelini ..................... | 296/193.09 |
| 2008/0001436 A1 | * | 1/2008 | Bierjon et al. .............. | 296/192 |

FOREIGN PATENT DOCUMENTS

WO    WO 2006024717    *    4/2007

* cited by examiner

*Primary Examiner*—Glenn Dayoan
*Assistant Examiner*—Gregory Blankenship
(74) *Attorney, Agent, or Firm*—Global IP Counselors, LLP

(57) ABSTRACT

A vehicle front end assembly is provided with a vehicle bumper fascia panel, a headlamp, a headlamp support bracket and a bumper fascia reinforcement bracket. The vehicle bumper fascia panel has an inbound facing surface and an exterior surface. The headlamp is disposed above the vehicle bumper fascia panel. The headlamp support bracket is disposed below the headlamp. The headlamp support bracket has a first locating structure. The bumper fascia reinforcement bracket is fixed to the vehicle bumper fascia panel to overlie an end section of the inbound facing surface of the vehicle bumper fascia panel to reinforce the end section. The bumper fascia reinforcement bracket includes a second locating structure mating with the first locating structure to position the headlamp with respect to the vehicle bumper fascia panel.

21 Claims, 6 Drawing Sheets

VEHICLE FRONT END ASSEMBLY

BACKGROUND OF THE INVENTION

1. Field of the Invention

The present invention generally relates to a vehicle front end assembly. More specifically, the present invention relates to a vehicle bumper fascia reinforcement bracket that supports the fascia of a bumper and that also aids in positioning the fascia relative to a headlamp.

2. Background Information

For many years, automotive vehicles have been provided with front and rear bumpers to cushion the vehicle in the event of an impact. Also, for many years, automotive vehicles have been provided with numerous body and/or fascia panels coupled thereto to form the outer shell of the vehicle body. In recent years, it has been desirable to make vehicles with a smooth exterior shape, in which the bumpers are integrated with the overall shape of the vehicle body. Thus, in recent years, bumpers have often been provided with bumper fascia mounted to the bumpers such that the bumper fascia extends across the bumper and wraps around the corners of the bumper.

To help control the bumper fascia fit and finish to mating parts (i.e. fender, headlamps, grille, etc), some type of locating feature is provided between the bumper fascia and the mating parts. For example, the headlamps of the vehicle are often located directly above the bumper fascia with an exterior seam formed therebetween. To improve the fit and finish between the headlamps and the bumper fascia, the bumper fascia is often directly connected to the headlamp assemblies. While these conventional structures work well in most applications, they may not be effectively used in all situations. In other words, in certain situations, it is not cost effective to use these conventional structures. For example, when styling changes occur in a vehicle, the bumper fascia may not change, but some of the mating parts may change, which could result in the locating structures between the headlamps and the bumper fascia to also change. Thus, if part of the locating structures is an integral part of the bumper fascia, then the bumper fascia must be retooled, which could require additional costs as well as increase parts complexity at the assembly plant.

In view of the above, it will be apparent to those skilled in the art from this disclosure that there exists a need for an improved vehicle front end assembly that allows for locating a bumper fascia with respect to a headlamp. This invention addresses this need in the art as well as other needs, which will become apparent to those skilled in the art from this disclosure.

SUMMARY OF THE INVENTION

One object of the present invention to provide a vehicle bumper fascia reinforcement bracket that supports a bumper fascia panel and that interconnects the bumper fascia panel to a headlamp to properly locate the bumper fascia panel with respect to the headlamp.

In view of the foregoing object, a vehicle bumper fascia reinforcement bracket is provided that basically comprises a vehicle bumper fascia panel, a headlamp, a headlamp support bracket and a bumper fascia reinforcement bracket. The vehicle bumper fascia panel has an inbound facing surface and an exterior surface. The headlamp is disposed above the vehicle bumper fascia panel. The headlamp support bracket is disposed below the headlamp. The headlamp support bracket has a first locating structure. The bumper fascia reinforcement bracket is fixed to the vehicle bumper fascia panel to overlie an end section of the inbound facing surface of the vehicle bumper fascia panel to reinforce the end section. The bumper fascia reinforcement bracket includes a second locating structure mating with the first locating structure to position the headlamp with respect to the vehicle bumper fascia panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
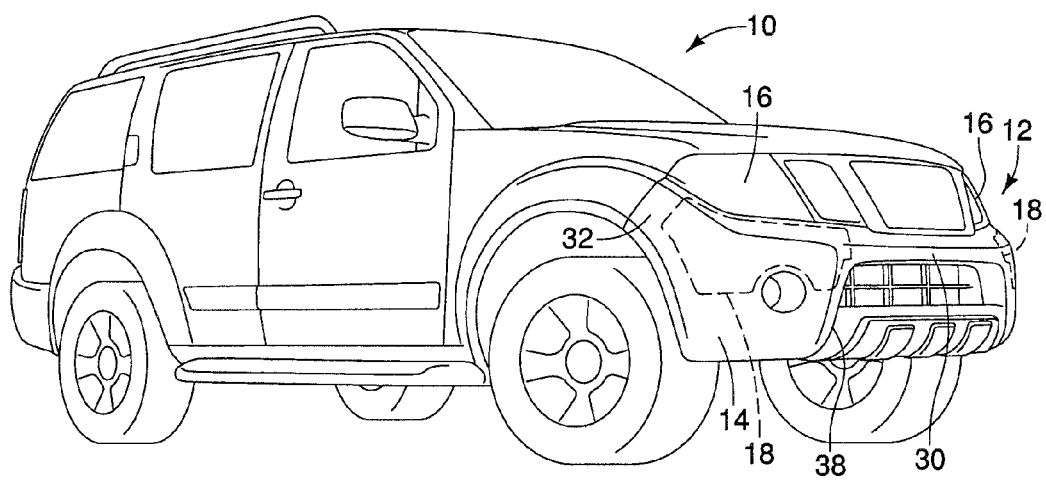
FIG. 1 is a front perspective view of a vehicle equipped with a vehicle front end assembly having a vehicle bumper fascia reinforcement bracket in accordance with one embodiment.
Figure 2:
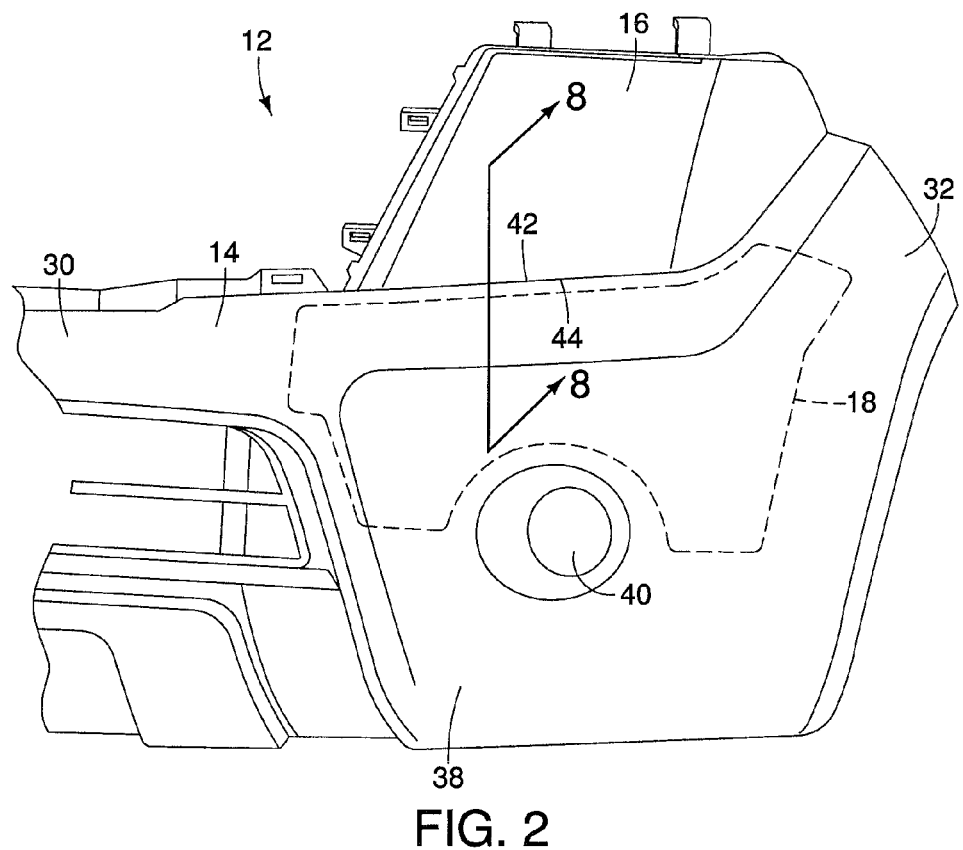
FIG. 2 is an enlarged front perspective view of the driver side of the vehicle front end assembly illustrated in FIG. 1 including a bumper fascia panel and one (drivers' side) of the headlamp housings.

Referring initially to FIGS. 1 and 2, an automotive vehicle 10 is illustrated with a vehicle front end assembly 12 in accordance with one embodiment. The vehicle 10 is conventional, except for the vehicle front end assembly 12 as described herein. Accordingly, the vehicle 10 and its various parts will not be discussed and/or illustrated in detail herein, except as related to the vehicle front end assembly 12. The vehicle front end assembly 12 basically includes a vehicle bumper fascia panel 14, a pair of headlamps 16 and a pair of bumper fascia reinforcement brackets 18. As explained below in more detail, the bumper fascia reinforcement brackets 18 perform the functions of supporting the ends of the bumper fascia panel 14 to provide the rigidity to the bumper fascia panel 14 and controlling the fit and finish in the lower areas of the headlamps 16. In the illustrated embodiment, the bumper fascia reinforcement brackets 18 interconnect the bumper fascia panel 14 to a pair of headlamp support brackets 20 (shown in FIGS. 3 and 8-11) such that the bumper fascia panel 14 is properly positioned relative to the headlamps 16.

Figure 8:
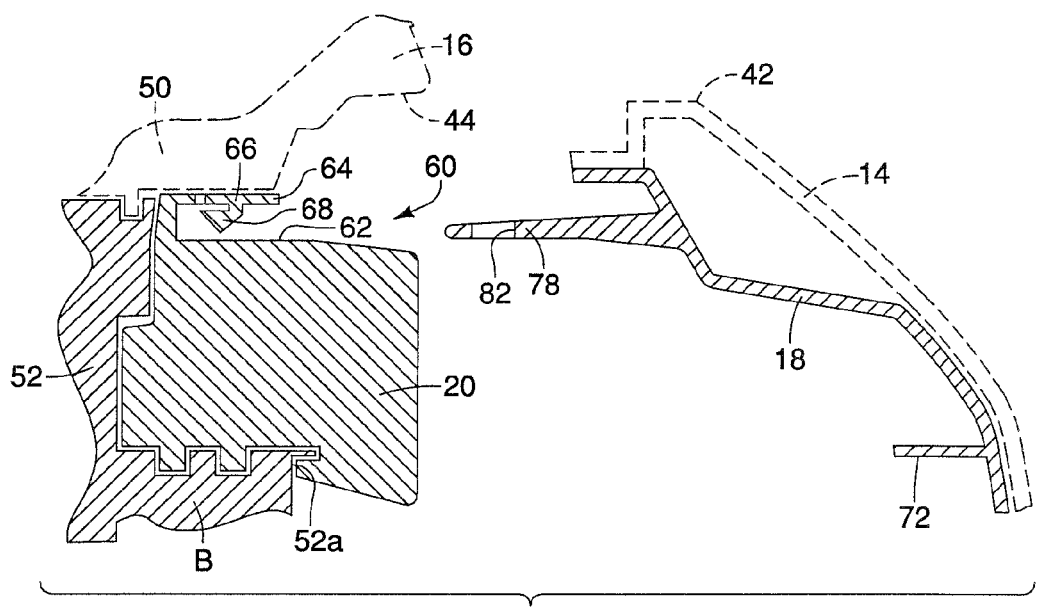
FIG. 8 is a simplified cross sectional side view of the vehicle front end assembly showing one of the headlamp support brackets and one of the bumper fascia reinforcement brackets prior to installation of the vehicle bumper fascia to the headlamp support bracket as seen along section line 8-8 in FIG. 2.
Figure 9:
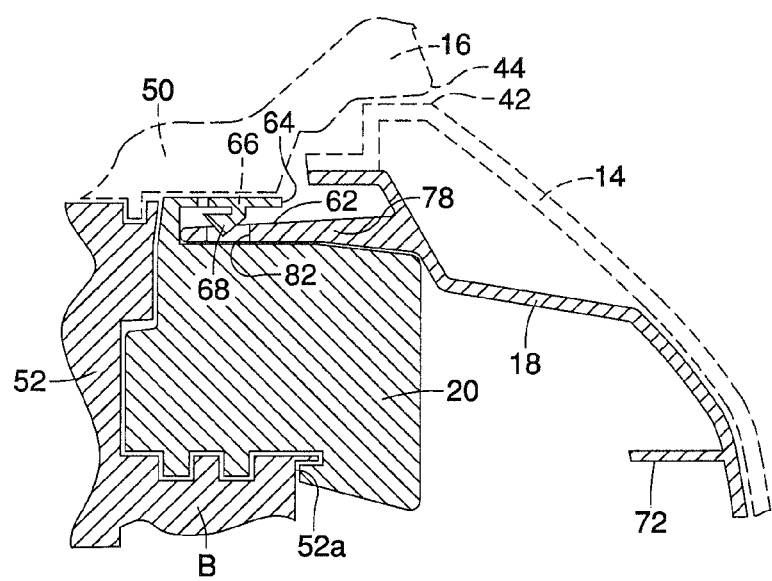
FIG. 9 is a simplified cross sectional side view of the vehicle front end assembly showing the one of the headlamp support brackets and the one of the vehicle bumper fascia reinforcement brackets connected to one another, as seen along section line 8-8 in FIG. 2.

Basically, the bumper fascia panel 14 is a one-piece, unitary member formed of a thin, lightweight sheet material such as a rigid plastic material (e.g., a thermoplastic olefin elastomer) or any other suitable material. In any case, the bumper fascia panel 14 should be constructed of a self supporting material with a degree of flexibility such that the bumper fascia panel 14 is flexible yet maintains its shape. The bumper fascia panel 14 covers a rigid bumper assembly B (FIGS. 8 and 9 only).

Figure 4:
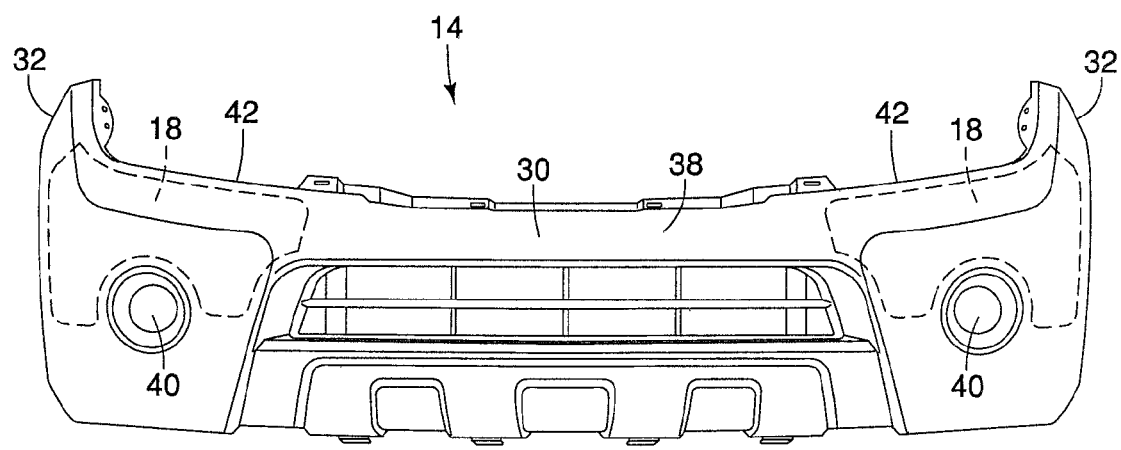
FIG. 4 is a front elevational view of the bumper fascia panel shown removed from the vehicle and further showing in phantom lines a pair of the bumper fascia reinforcement brackets.

As seen in FIGS. 1, 2 and 4, the bumper fascia panel 14 includes an elongated middle section 30 and a pair of bent end sections 32. The bent end sections 32 are arranged at opposite ends of the middle section 30 such that the bumper fascia panel 14 has a wide, substantially U-shaped overall profile as viewed from above. The bent end sections 32 of the bumper fascia panel 14 are symmetrical with respect to a center longitudinal axis of the vehicle 10. The bent end sections 32 of the bumper fascia panel 14 are also mounted to a pair of fenders via a plurality of fasteners (not shown). Since the connections between the bumper fascia panel 14 and the fenders are not relevant, the connections between the bumper fascia panel 14 and the fenders will not be discussed herein. Moreover, since the bent end sections 32 of the bumper fascia panel 14 are mirror images of each other, only the bent end section 32 that is located on the driver's side will be discussed and illustrated herein. The bumper fascia panel 14 has an inbound facing surface 36 shown in FIG. 5 and an exterior surface 38 shown in FIGS. 1, 2 and 4.

Figure 5:
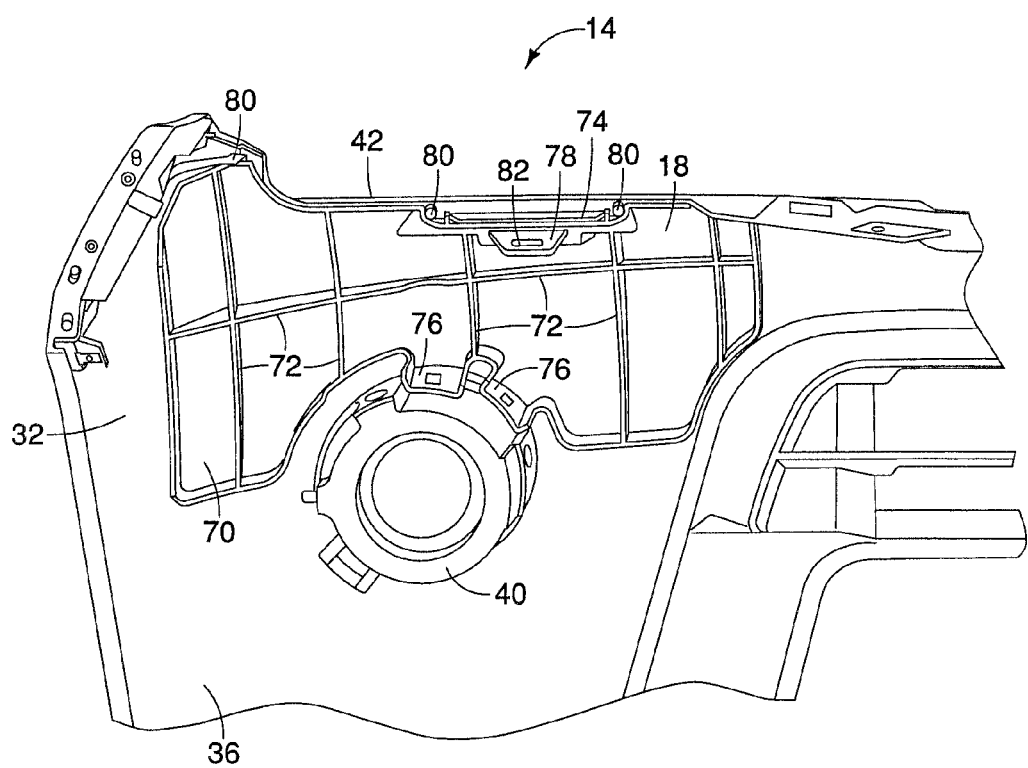
FIG. 5 is an interior side elevational view of the left half of the bumper fascia panel with the bumper fascia reinforcement bracket and a fog lamp assembly mounted thereto.

As shown best in FIG. 5, a pair of fog lamps 40 (only one shown in FIG. 5) are mounted to the inbound facing surface 36 of the bumper fascia panel 14 in a conventional manner. As shown in FIGS. 1, 2 and 4, the fog lamps 40 are exposed to the exterior surface 38 via fog lamp apertures formed in the bumper fascia panel 14.

Figure 3:
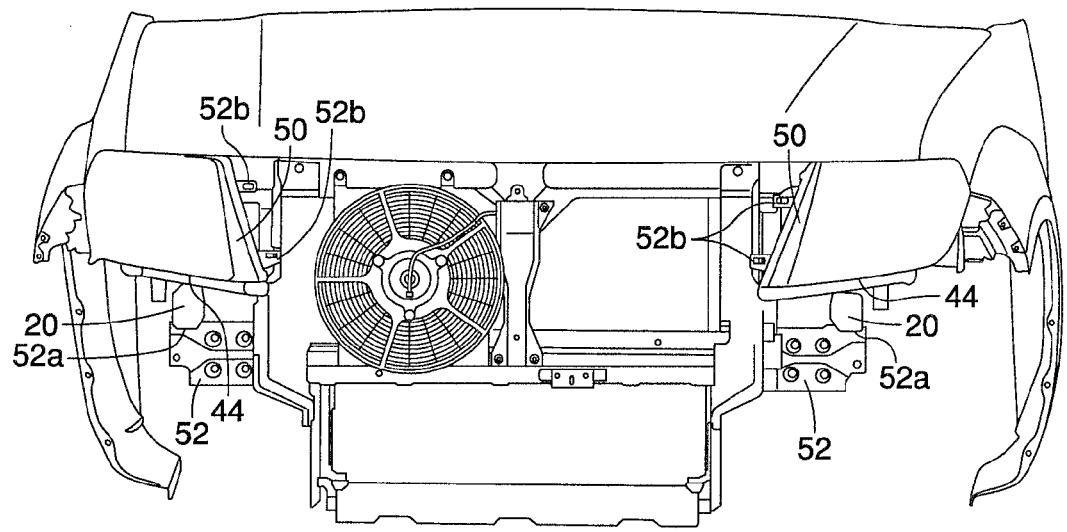
FIG. 3 is a front elevational view of the vehicle illustrated in FIG. 1 with the bumper fascia panel and a bumper assembly removed showing a pair of headlamp support brackets and a pair of headlamps.

The exterior surface 38 of the bumper fascia panel 14 includes an upper exteriorly exposed edge 42, as best shown in FIGS. 2 and 4. A portion of the upper exteriorly exposed edge 42 is shaped to conform to a lower exteriorly exposed edge 44 of the headlamp 16, as best shown in FIGS. 2 and 3.

As seen in FIGS. 1 and 2, the headlamps 16 are disposed directly above the vehicle bumper fascia panel 14. The headlamps 16 are mirror images of each other, and thus, only the headlamp 16 that is located on the driver's side will be discussed and illustrated herein. Basically, as best shown in FIGS. 3 and 8-11, the headlamp 16 includes a headlamp housing 50 and the headlamp support bracket 20 (FIGS. 8-11). The headlamp housing 50 of the headlamp 16 also includes the lower exteriorly exposed edge 44, as best shown in FIGS. 2 and 3. The lower exteriorly exposed edge 44 of the headlamp housing 50 (FIGS. 2, 3, 8 and 9) is shaped to confirm to the shape of the adjacent portion of the upper exteriorly exposed edge 42 of the exterior surface 38 of the bumper fascia panel 14 (FIGS. 2, 4, 5, 8 and 9). More specifically, the lower exteriorly exposed edge 44 of the headlamp housing 50 and the exterior surface 38 of the bumper fascia panel 14 define a transition seam between the bumper fascia panel 14 and the headlamp 16, as shown in FIG. 2. Since the remaining structure and configuration of the headlamp 16 are conventional, the headlamps 16 will not be discussed or illustrated in detail.

A description of the headlamp support bracket 20 is now provided with specific reference to FIGS. 3 and 8-11. The headlamp support bracket 20 is basically a conventional element that is installed to one or both of the rigid bumper assembly B (FIGS. 8 and 9 only) and a front end support structure 52 of the vehicle 10 in a conventional manner as indicated in FIGS. 3 and 8-11. The headlamp support bracket 20 supports an underside of the headlamp 16 and also supports the bumper fascia panel 14 in a manner described in greater detail below. The front end support structure 52 has the headlamp support brackets 20 being attached to the front end support structure 52 at lower attachment points 52*a* via the rigid bumper assembly B. Also the front end support structure 52 has the headlamps 16 being attached to the front end support structure at upper attachment points 52*b* that are separate and distinct from the lower attachment points 52*a*.

Figure 10:
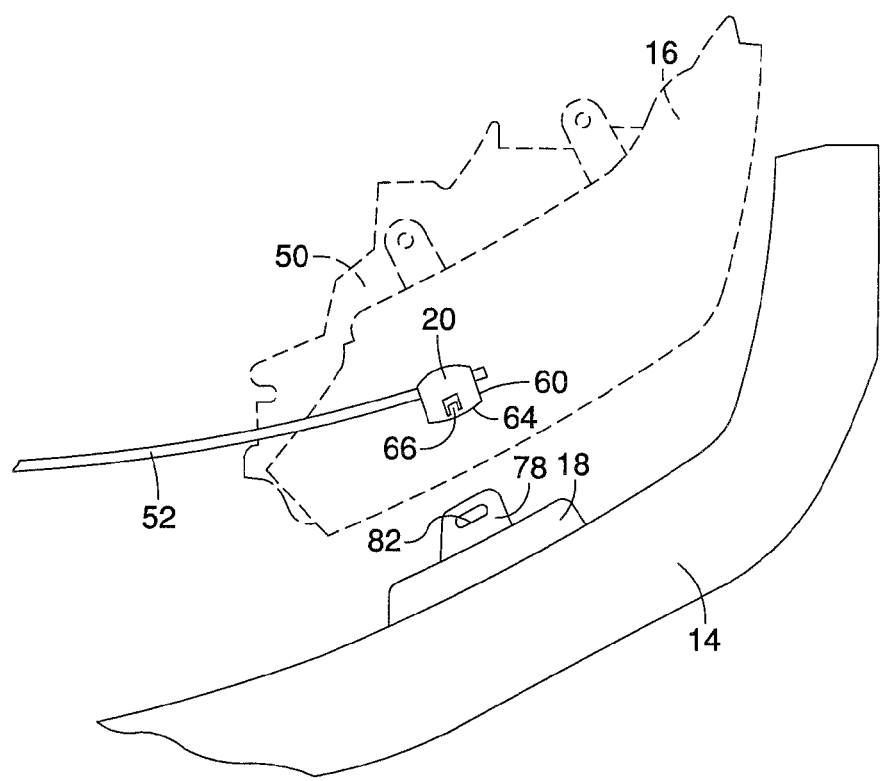
FIG. 10 is a simplified schematic top view of the vehicle front end assembly showing the one of the headlamp support brackets and the one of the bumper fascia reinforcement brackets prior to installation of the vehicle bumper fascia to the vehicle.

As best shown in FIGS. 8 and 10, the headlamp support bracket 20 includes a first locating structure 60 that cooperates with the bumper fascia reinforcement bracket 18, as discussed below, to form a snap-fit connection therebetween. The first locating structure 60 includes a recess 62 (FIG. 8) defined between a lower portion of the headlamp support bracket 20 and a cantilevered extension 64.

Figure 11:
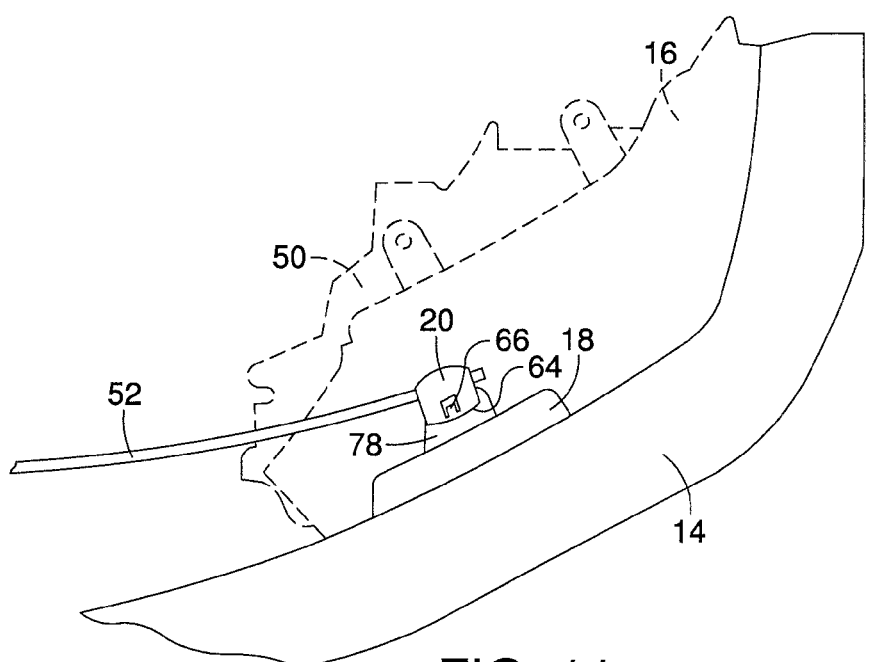
FIG. 11 is a simplified schematic top view of the vehicle front end assembly showing the one of the headlamp support brackets and the one of the vehicle bumper fascia reinforcement brackets connected to one another.

As best shown in FIGS. 10 and 11, the cantilevered extension 64 includes a U-shaped opening that surrounds and defines an attachment clip 66. As best shown in FIGS. 8 and 9, the attachment clip 66 includes a projection 68 that extends downward part way into the recess 62. Only the location and configuration of the first locating structure 60 are relevant to the positioning of the vehicle bumper fascia panel 14 with respect to the headlamp 16. More specifically, the first locating structure 60 is dimensioned and shaped to mate with a part of the bumper fascia reinforcement bracket 18, as discussed below, to control the fit and finish in the lower area of the headlamp 16 with respect to the bumper fascia panel 14. The headlamp support bracket 20 is preferably made of a metal or rigid plastic/polymer material. However, the attachment clip 66 is preferably formed with a limited amount of flexibility thereby permitting slight resilient movement such that the snap-fit connection is reliably achieved during assembly.

Figure 6:
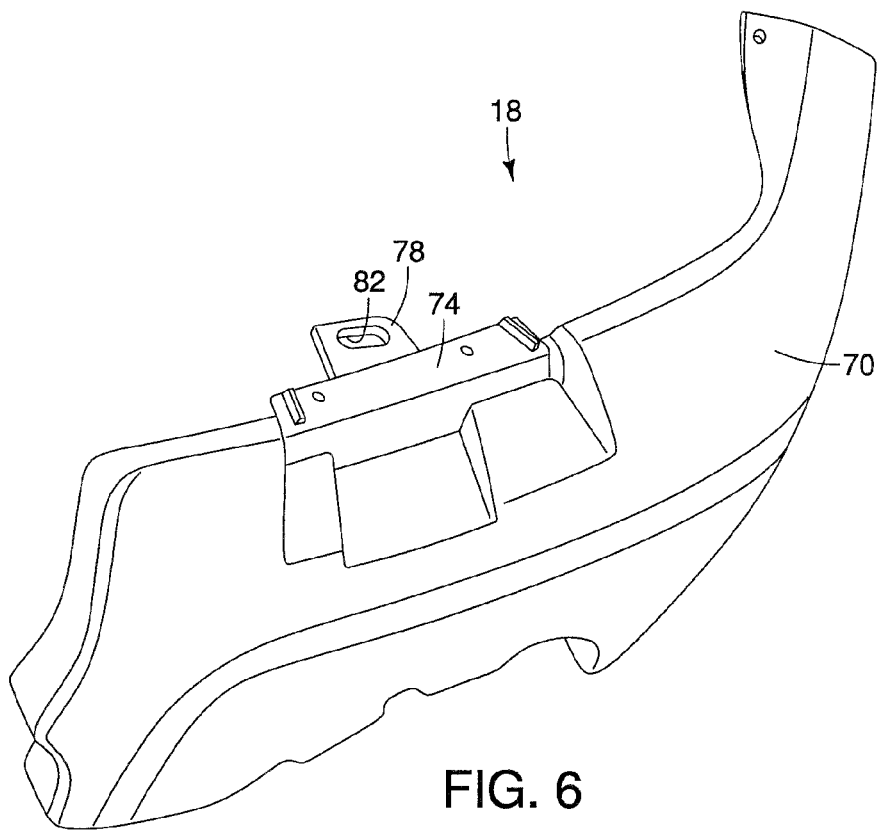
FIG. 6 is a front perspective view of the bumper fascia reinforcement bracket shown removed from the bumper fascia panel.
Figure 7:
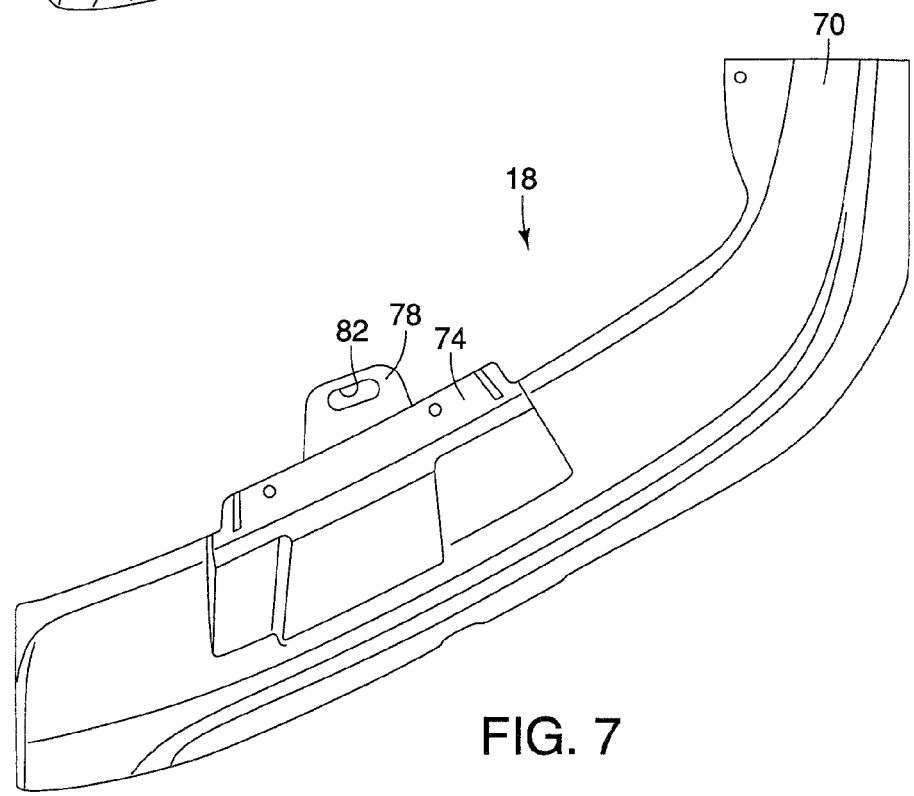
FIG. 7 is a top plan view of the bumper fascia reinforcement bracket shown removed from the bumper fascia panel.

As seen in FIGS. 5, 6 and 7, the bumper fascia reinforcement bracket 18 is a one-piece unitary member formed of a rigid plastic material. Preferably, the bumper fascia reinforcement bracket 18 is formed by injection molding using a thermoplastic material that is rigid. Generally speaking, the bumper fascia reinforcement bracket 18 improves rigidity of the end section 32 of the bumper fascia panel 14 and controls the fit and finish in the lower area of the headlamp 16.

The bumper fascia reinforcement bracket 18 basically includes a body portion 70, a plurality of reinforcing ribs 72 (FIG. 5 only), an upper attachment flange 74, a pair of lower attachment flanges 76 (FIG. 5 only) and a locating tab 78. The bumper fascia reinforcement bracket 18 is fixed to the vehicle bumper fascia panel 14 to overlie the end section 32 of the inbound facing surface of the vehicle bumper fascia panel 14 to reinforce the end section 32.

The locating tab 78 of the bumper fascia reinforcement bracket 18 constitutes a second locating structure that mates with the attachment clip 66. Hence, the first locating structure 60 of the headlamp support bracket 20 to control the fit and finish in the lower area of the headlamp 16 with respect to the bumper fascia panel 14. In other words, the locating tab 78 and the attachment clip 66 are engaged during assembly to attach the vehicle bumper fascia panel 14 to the headlamp support bracket 20 for properly locating the upper exteriorly exposed edge 42 of the bumper fascia panel 14 with respect to the lower exteriorly exposed edge 44 of the headlamp 16. The locating tab 78 and the attachment clip 66 cooperate together to control movement of the headlamp 16 in the Z-direction of the vehicle. Thus, the locating tab 66 and the attachment clip 78 provides a headlamp gap control feature that controls the fit and finish of the transition seam defined by the upper exteriorly exposed edge 42 of the bumper fascia panel 14 and the lower exteriorly exposed edge 44 of the headlamp 16.

The body portion 70 of the bumper fascia reinforcement bracket 18 is contoured to substantially match the contour of a part of the end section 32 of the bumper fascia panel 14, as indicated in FIG. 5. The body portion 70 has an outbound facing surface that at least partially contacts the inbound facing surface 36 of the bumper fascia panel 14. An inbound facing surface of the bumper fascia reinforcement bracket 18 has the reinforcing ribs 72 formed thereon. The reinforcing ribs 72 extend in both vertical and horizontal directions to help improve rigidity of the bumper fascia reinforcement bracket 18, which in turn improves rigidity of the bumper fascia panel 14. As best shown in FIG. 5, the upper attachment flange 74 and the lower attachment flanges 76 extend generally horizontally from the body portion 70 in an inbound direction. In this illustrated embodiment, the upper attachment flange 74 is riveted to the bumper fascia panel 14 at three attachment points by three rivets 80, as indicated in FIG. 5. The lower attachment flanges 76 are attached to the bumper fascia panel 14 and the fog lamps 40 by using screw/J-nut attachments, which are well known in the automotive field for attaching body panels. The locating tab 78 is disposed along an upper edge of the bumper fascia reinforcement bracket 18. Hence, once installed the bumper fascia reinforcement bracket 18 is installed to the bumper fascia panel 14, the locating tab 78 is disposed adjacent to the upper exteriorly exposed edge 42 of the bumper fascia panel 14.

As best shown in FIGS. 9 and 11, the locating tab 78 of the bumper fascia reinforcement bracket 18 engages the attachment clip 66 to position the vehicle bumper fascia panel 14 with respect to the headlamp 16. In this illustrated embodiment best shown in FIGS. 8 and 10, the locating tab 78 includes an opening 82. As best shown in FIG. 9, once the locating tab 78 is installed to the headlamp support bracket 20, the projection 68 of the attachment clip 66 is disposed in the opening 82 to limit relative movement between the headlamp 16 and the bumper fascia panel 14. The projection 68 of the attachment clip 66 and the opening 82 of the locating tab 78 are configured and arranged with respect to each other to form a snap-fit connection therebetween. The locating tab 78 is horizontally oriented when the vehicle front end assembly 12 is installed on the vehicle 10.

In the illustrated embodiment, as seen in FIG. 9, the attachment clip 66 is disposed rearwardly of the lower exteriorly exposed edge 44 of the headlamp 16 that mates with the upper exteriorly exposed edge 42 to define the transition seam between the vehicle bumper fascia panel 14 and the headlamp 16. The locating tab 78 preferably extends rearward of the transition seam such that the attachment clip 66 and the locating tab 78 are connected together at a position rearward of the transition seam.

A method for assembly of the vehicle front end assembly 12 is now described with specific reference to FIGS. 3 and 8-11. In FIG. 3, the vehicle 10 is shown with the bumper fascia panel 14 uninstalled revealing the headlamp support brackets 20. Hence, the headlamp support brackets 20 and the headlamps 16 are installed prior to installation of the bumper fascia panel 14. Consequently, the headlamp support brackets 20 having the attachment clip 66 (the first locating structure 60) are installed to the front end structure 52. The headlamps 16 are also installed to the front end structure 52 adjacent and above the headlamp support brackets 20. The rigid bumper assembly B (FIGS. 8 and 9 only) are installed to the front end structure 52 in a conventional manner before or after installation of the headlamps 16. The fog lamps 40 and the bumper fascia reinforcement brackets 18 are installed to the bumper fascia panel 14 either prior to installation of the headlamps 16 and the headlamp support brackets 20 or shortly thereafter. Thereafter, the bumper fascia panel 14 and the bumper fascia reinforcement brackets 18 are brought into proximity to the headlamp support brackets 20 and the headlamps 16, as indicated in FIGS. 8 and 10. Specifically, the locating tabs 78 (the second locating structure) of the two bumper fascia reinforcement brackets 18 are brought into proximity to the headlamp support brackets 20 and the headlamps 16. Finally as shown in FIGS. 9 and 11, the bumper fascia panel 14 is installed to the front of the vehicle 10 such that the locating tab 78 is inserted into the recess 62 resulting in the attachment clip 66 and the locating tab 78 (the first and second locating structures) operatively engaging one another to position the bumper fascia panel 14 relative to the headlamp 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the bumper fascia reinforcement bracket. Accordingly, these terms, as utilized to describe the present invention should be interpreted relative to a vehicle equipped with the bumper fascia reinforcement bracket. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front end assembly comprising:
   a vehicle bumper fascia panel having an inbound facing surface and an exterior surface;
   a headlamp disposed above the vehicle bumper fascia panel;
   a headlamp support bracket disposed below the headlamp with the headlamp support bracket including a first locating structure, the first locating structure of the headlamp support bracket includes an attachment clip; and
   a bumper fascia reinforcement bracket fixed to the vehicle bumper fascia panel to overlie an end section of the inbound facing surface of the vehicle bumper fascia panel to reinforce the end section, the bumper fascia reinforcement bracket including a second locating structure mating with the first locating structure to position the vehicle bumper fascia panel with respect to the headlamp, the second locating structure of the bumper fascia reinforcement bracket having a locating tab engaging the attachment clip to attach the headlamp and the vehicle bumper fascia panel together.

2. The vehicle front end assembly according to claim 1, wherein
   the bumper fascia reinforcement bracket is fixedly attached to the vehicle bumper fascia panel at a location spaced apart from the first locating structure.

3. The vehicle front end assembly according to claim 1, further comprising
   a front end support structure with the headlamp being attached to the front end support structure at an upper attachment point and the headlamp support bracket being attached to the front end support structure at a lower attachment point that is separate and distinct from the upper attachment point.

4. The vehicle front end assembly according to claim 1, wherein
   the attachment clip includes a projection; and
   the locating tab includes an opening with the projection of the attachment clip disposed in the opening to limit relative movement between the headlamp and the vehicle bumper fascia panel.

5. The vehicle front end assembly according to claim 4, wherein
   the projection of the attachment clip and the opening of the locating tab are configured and arranged with respect to each other to form a snap-fit connection therebetween.

6. The vehicle front end assembly according to claim 4, wherein
   the first locating structure of the headlamp support bracket includes a recess with the projection of the attachment clip extending into the recess; and
   the locating tab of the second locating structure of the bumper fascia reinforcement bracket extends into the recess.

7. The vehicle front end assembly according to claim 1, wherein
   the locating tab is horizontally oriented when the vehicle front end assembly is installed on a vehicle.

8. The vehicle front end assembly according to claim 1, wherein
   the locating tab is disposed along an upper edge of the bumper fascia reinforcement bracket.

9. The vehicle front end assembly according to claim 1, wherein
   the vehicle bumper fascia panel includes an exterior surface with an upper exteriorly exposed edge; and
   the headlamp includes a lower exteriorly exposed edge that mates with the upper exteriorly exposed edge to define a transition seam between the vehicle bumper fascia panel and the headlamp.

10. The vehicle front end assembly according to claim 1, wherein
    the bumper fascia reinforcement bracket is integrally formed as a one-piece, unitary member.

11. The vehicle front end assembly according to claim 1, wherein
    the attachment clip is disposed rearwardly of a lower exteriorly exposed edge of the headlamp that mates with an upper exteriorly exposed edge to define a transition seam between the vehicle bumper fascia panel and the headlamp; and
    the locating tab extends rearward of the transition seam such that the attachment clip and the locating tab are connected together at a position rearward of the transition seam.

12. The vehicle front end assembly according to claim 1, wherein
    the attachment clip extends in a horizontal direction engaging the second locating structure with the vehicle front end assembly installed on a vehicle.

13. The vehicle front end assembly according to claim 1, wherein
    the first locating structure of the headlamp support bracket includes a recess dimensioned to receive the locating tab.

14. The vehicle front end assembly according to claim 13, wherein
    the locating tab extends in a horizontal direction and extends into the recess with the vehicle front end assembly installed on a vehicle.

15. The vehicle front end assembly according to claim 12, wherein
    the locating tab includes an opening, and
    the attachment clip includes projection that extends in a vertical direction into the opening of the locating tab limiting relative movement between the headlamp and the vehicle bumper fascia panel.

16. A vehicle front end assembly comprising:
    a vehicle bumper fascia panel having an inbound facing surface and an exterior surface;
    a headlamp disposed above the vehicle bumper fascia panel;
    a headlamp support bracket disposed below the headlamp with the headlamp support bracket including a first locating structure;

a bumper fascia reinforcement bracket fixed to the vehicle bumper fascia panel to overlie an end section of the inbound facing surface of the vehicle bumper fascia panel to reinforce the end section, the bumper fascia reinforcement bracket including a second locating structure mating with the first locating structure to position the vehicle bumper fascia panel with respect to the headlamp;

a front end support structure with the headlamp being attached to the front end support structure at an upper attachment point and the headlamp support bracket being attached to the front end support structure at a lower attachment point that is separate and distinct from the upper attachment point; and a rigid bumper assembly attached to the front end support structure with the lower attachment point being at least partially formed by the rigid bumper assembly.

17. A vehicle front end assembly method comprising:

installing a headlamp support bracket having a first locating structure to a vehicle front end;

positioning a headlamp to the vehicle front end adjacent the headlamp support bracket;

installing a bumper fascia reinforcement bracket having a second locating structure to a bumper fascia panel such that the bumper fascia reinforcement bracket is fixedly attached to the bumper fascia panel at a location spaced apart from the second locating structure; and installing the bumper fascia panel to the vehicle front end and inserting a locating tab of the bumper fascia reinforcement bracket into a recess of the headlamp support bracket such that the first and second locating structures operatively engage one another to position the bumper fascia panel relative to the headlamp and the inserting of the locating tab of the bumper fascia reinforcement bracket into the recess of the headlamp support bracket causes a projection of the headlamp support bracket to extend into an opening of the locating tab upon insertion.

18. The vehicle front end assembly method according to claim 17, wherein the inserting of the locating tab urges an edge of the bumper fascia panel into alignment with an adjacent edge of the headlamp.

19. The vehicle front end assembly method according to claim 17, wherein the installing of the bumper fascia panel urges an edge of the bumper fascia panel into alignment with an adjacent edge of the headlamp.

20. The vehicle front end assembly method according to claim 17, wherein the installing of the headlamp support bracket to the vehicle front end includes positioning the headlamp support bracket beneath the headlamp.

21. A vehicle front end assembly method comprising:

installing a headlamp support bracket having a first locating structure to a vehicle front end;

positioning a headlamp to the vehicle front end adjacent the headlamp support bracket;

installing a bumper fascia reinforcement bracket having a second locating structure to a bumper fascia panel such that the bumper fascia reinforcement bracket is fixedly attached to the bumper fascia panel at a location spaced apart from the second locating structure;

installing the bumper fascia panel to the vehicle front end such that the first and second locating structures operatively engage one another to position the bumper fascia panel relative to the headlamp; and the installing of the bumper fascia panel to the vehicle front end is initially accomplished by as snap-fit between the first and second locating structures.

* * * * *